(12) United States Patent
Tanabe

(10) Patent No.: US 7,727,398 B2
(45) Date of Patent: Jun. 1, 2010

(54) COLORED WASTEWATER DISCOLORATION METHOD

(76) Inventor: Seisuke Tanabe, c/o Ichiro Tanaka, 1610-3 Koshigoe, Ueda-shi, Nagano (JP) 386-0403

( * ) Notice: Subject to any disclaimer, the term of this patent is extended or adjusted under 35 U.S.C. 154(b) by 7 days.

(21) Appl. No.: 12/221,327

(22) Filed: Aug. 1, 2008

(65) Prior Publication Data

US 2009/0032459 A1 Feb. 5, 2009

(30) Foreign Application Priority Data

Aug. 1, 2007 (JP) .............................. 2007-200522

(51) Int. Cl.
*C02F 9/14* (2006.01)
(52) U.S. Cl. .................. 210/617; 210/631; 210/663; 210/670; 210/691; 210/694; 210/917
(58) Field of Classification Search ................. 210/617, 210/631, 663, 670, 690, 691, 694, 917
See application file for complete search history.

(56) References Cited

U.S. PATENT DOCUMENTS

| | | | | |
|---|---|---|---|---|
| 4,237,002 A | * | 12/1980 | Strudgeon et al. | 210/631 |
| 4,626,354 A | * | 12/1986 | Hoffman et al. | 210/631 |
| 4,663,047 A | * | 5/1987 | Krauthausen et al. | 210/617 |
| 4,676,907 A | * | 6/1987 | Harrison | 210/617 |
| 4,882,058 A | * | 11/1989 | Burton | 210/617 |
| 5,091,089 A | * | 2/1992 | Shen et al. | 210/917 |
| 5,302,288 A | * | 4/1994 | Meidl et al. | 210/631 |
| 5,429,747 A | * | 7/1995 | Carr et al. | 210/694 |
| 5,676,836 A | * | 10/1997 | Yamasaki et al. | 210/617 |
| 5,820,762 A | * | 10/1998 | Bamer et al. | 210/691 |
| 6,905,603 B2 | * | 6/2005 | Mirzayi et al. | 210/617 |

FOREIGN PATENT DOCUMENTS

| | | |
|---|---|---|
| JP | 2001-078760 | 3/2001 |
| JP | 2001-219176 | 5/2001 |

* cited by examiner

*Primary Examiner*—Christopher Upton
(74) *Attorney, Agent, or Firm*—Jordan and Hamburg LLP

(57) ABSTRACT

Colored wastewater from industries, agriculture and the like is discolored by adjusting pH of the wastewater and filtering the wastewater through a mixture of acid-treated sawdust produced from sawdust which has been disposed of after being used for fungi production and charcoal thereby to remove a color component fraction from the wastewater and through a filter material, for example acid-treated rice husk charcoal, in which autochthonous microorganisms are embedded thereby to absorb color components remaining in the wastewater.

9 Claims, 16 Drawing Sheets

COLORED WASTEWATER DISCOLORATION METHOD

REFERENCE TO RELATED APPLICATION

The disclosure of Japanese patent application JP 2007-200522, filed Aug. 1, 2007, based upon which Convention priority is claimed, is hereby incorporated herein by reference.

BACKGROUND OF THE INVENTION

The present invention relates to a colored wastewater discoloration method, which can discolor and make colored wastewater and the like being generated from various production sites, human daily activities and so on and such as dye and pigment wastewater from textile industry and the like, pottery manufacturing industry wastewater containing glaze and the like, plating wastewater from metal-processing industry and the like, livestock industry wastewater, agroforestry wastewater, food industry wastewater, chemical and oil industry wastewater, electrical and electronics industry wastewater, iron and machine industry wastewater, restaurant industry wastewater and the like, into clear and colorless water, as well as reducing BOD, COD, total nitrogen, total phosphorus and so on.

Conventional methods to discolor high-concentration or low-concentration colored wastewater, generated from various production activities, vary in treatment techniques according to generation and quality of the wastewater. However, none of such methods uses a single technique. They use a combination of two or three techniques, yet not achieving satisfactory treatment. Especially discoloration has hardly been achieved ever.

In case the wastewater volume to be treated is small, such treatment methods are available as disposal treatment by an outsourced industrial waste collector, electrolytic cleaning treatment by electrolysis, agglomeration-separation cleaning treatment using coagulant such as anion and cation, activated sludge treatment by biodegradation treatment, and so on. However, all of these treatment methods are facing ever increasing production costs including for treatment facilities and various running costs, including for treatment of byproducts generated therefrom.

Thus, in reality it has been practiced, in case the colored wastewater to be treated is large in volume and contains no harmful substances, that it is mixed with substantial amount of industrial water and/or sea water and so on and then discharged into nature.

SUMMARY OF THE INVENTION

In view of the conventional drawback as described above, it is an object of the present invention to provide a colored wastewater discoloration method, which can discolor and make colored wastewater, being generated from various production sites and human daily activities, into clear and colorless water, efficiently by a simple method, as well as reducing BOD, COD, total nitrogen, total phosphorus and so on at low cost.

The above and further objects and novel features of the present invention will more fully appear from the following detailed description when the same is read in connection with the accompanying drawings. It is to be understood that these are for the purpose of illustration only and are not intended to be definition of the limits of the invention.

In order to achieve the above mentioned purpose, the present invention comprises a colored wastewater discoloration method including: an acid adjustment process wherein colored wastewater such as dye and pigment wastewater from textile industry and the like, pottery manufacturing industry wastewater containing glaze and the like, plating wastewater from metal-processing industry and the like, livestock industry wastewater, agroforestry wastewater, food industry wastewater, chemical and oil industry wastewater, electrical and electronics industry wastewater, iron and machine industry wastewater, restaurant industry wastewater and the like, are acid adjusted to pH 4 or lower by mixing with acid adjuster; a color component fraction separation process, wherein the acid wastewater, which has been treated in the acid adjustment process, is mixed as the alkaline adjuster to adjust the pH of the wastewater to at least 10 and this alkaline wastewater is passed through a color component fraction separation filter layer which is a mixture of acid treated sawdust with charcoal such as rice husk charcoal and activated carbon, the acid treated sawdust being made from sawdust which had been used for production of fungi; and then an adsorptive separation process wherein the remaining wastewater is passed through a filter laye, such as rice husk charcoal, embedded with autochthonous-microorganisms, i.e., microorganisms existing in nature, thereby to absorb remaining color components on the filter layer.

According to another aspect of the invention, the present invention is comprised of a colored wastewater discoloration method including: a color component fraction separation process wherein the color components fraction of the wastewater is separated in such manner that, in case the colored wastewater is acid wastewater, alkaline adjuster is added to and mixed with it until pH reaches 10 or over, followed by a step wherein acid adjuster is added to and mixed with it until pH reaches 3 or lower, or in case the colored wastewater is alkaline wastewater, acid adjuster is added to and mixed with it until pH reaches 3 or lower, followed by a step wherein alkaline adjuster is added to and mixed with it until pH reaches 10 or over; and an adsorptive separation process wherein following the color component fraction separation process, the remaining wastewater is passed through a filter layer, preferably of acid-treated rice husk charcoal, to adsorb remaining color components thereon, autochthonous-microorganisms, i.e., microorganisms existing in nature, having been embedded in the filter layer.

As is clear form the above-mentioned explanations, the present invention as hereinabove defined provides the effects enumerated below.

The present invention is, according to certain embodiments thereof, comprised of: an acid adjustment process wherein colored wastewater such as dye and pigment wastewater from textile industry and the like, pottery manufacturing industry wastewater containing glaze and the like, plating wastewater from metal-processing industry and the like, livestock industry wastewater, agroforestry wastewater, food industry wastewater, chemical and oil industry wastewater, electrical and electronics industry wastewater, iron and machine industry wastewater, restaurant industry wastewater and the like, are acid adjusted to pH 4 or lower by mixing with acid adjuster; a color component separation process, wherein, after the acid adjustment process, a color components-containing fraction of the acid wastewater is separated by passing the acid wastewater, which has been treated by the acid adjustment process, through a color component fraction separation filter layer which has been adjusted to be pH10 or over by adding alkaline adjuster to the filter layer, i.e., contacting the filter layer with alkaline adjuster, the filter layer being a mixture of acid treated sawdust made from sawdust disposed of in fungi production with charcoal such as rice husk charcoal and activated carbon; and an adsorptive separation process wherein following the color component fraction separation process, the wastewater from which the color components fraction has been separated is passed through a filter layer to be adsorbed thereon, the filter layer preferably being acid-treated rice husk charcoal, autochthonous-microorganisms, i.e., microorganisms existing in nature, having been embedded in the filter layer.

Therefore, the present invention can make the colored wastewater clear and colorless.

In the process described above, the filter layer embedded with autochtonous microorganisms can reduce content of BOD, COD, total nitrogen, total phosphorous and so on contained in the colored wastewater.

In the process described above, because no special facility is required, treatment of the colored wastewater can be done easily, in a short time, and at low cost.

In the process described above, because of passing the colored wastewater through the color component fraction separation filter layer and the autochthonous microorganisms embedded filter layer, treatment of the colored wastewater can be done easily and in a short time.

In the process described above, by treatment of the wastewater with the color component fraction separation filter layer and the filter layer embedded with autochthonous microorganisms, traces of precious metals and hazardous substances can be adsorptively separated.

According to other embodiments of the invention, wastewater which is initially acidic, instead of alkaline, can be treated equally effectively.

DETAILED DESCRIPTION OF THE INVENTION

Preferred embodiments to practice the present invention will now be described in detail below referring to the accompanying drawings.

Figure 1:
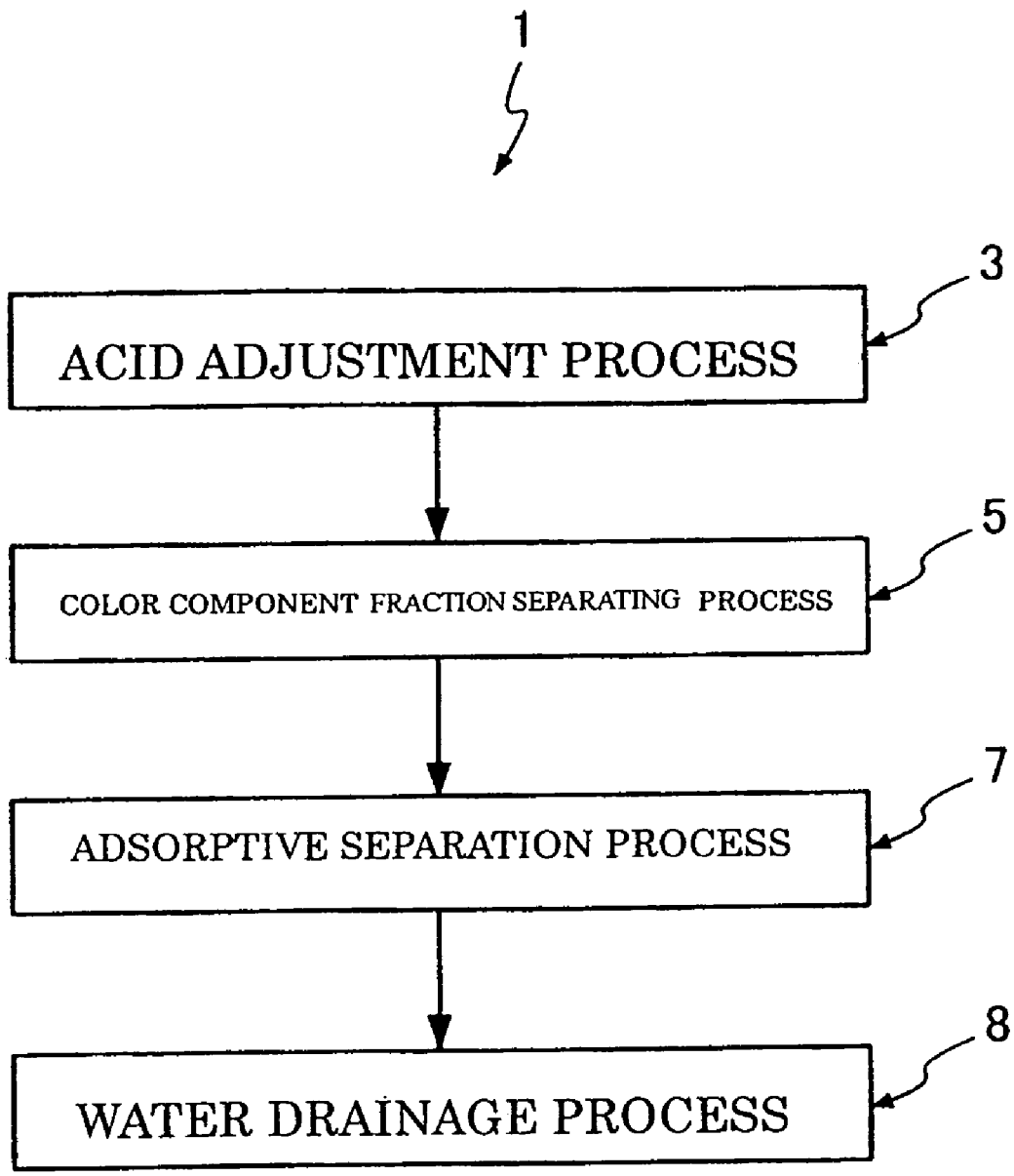
FIG. 1 is a process diagram to practice a first preferred embodiment of the present invention.
Figure 2:
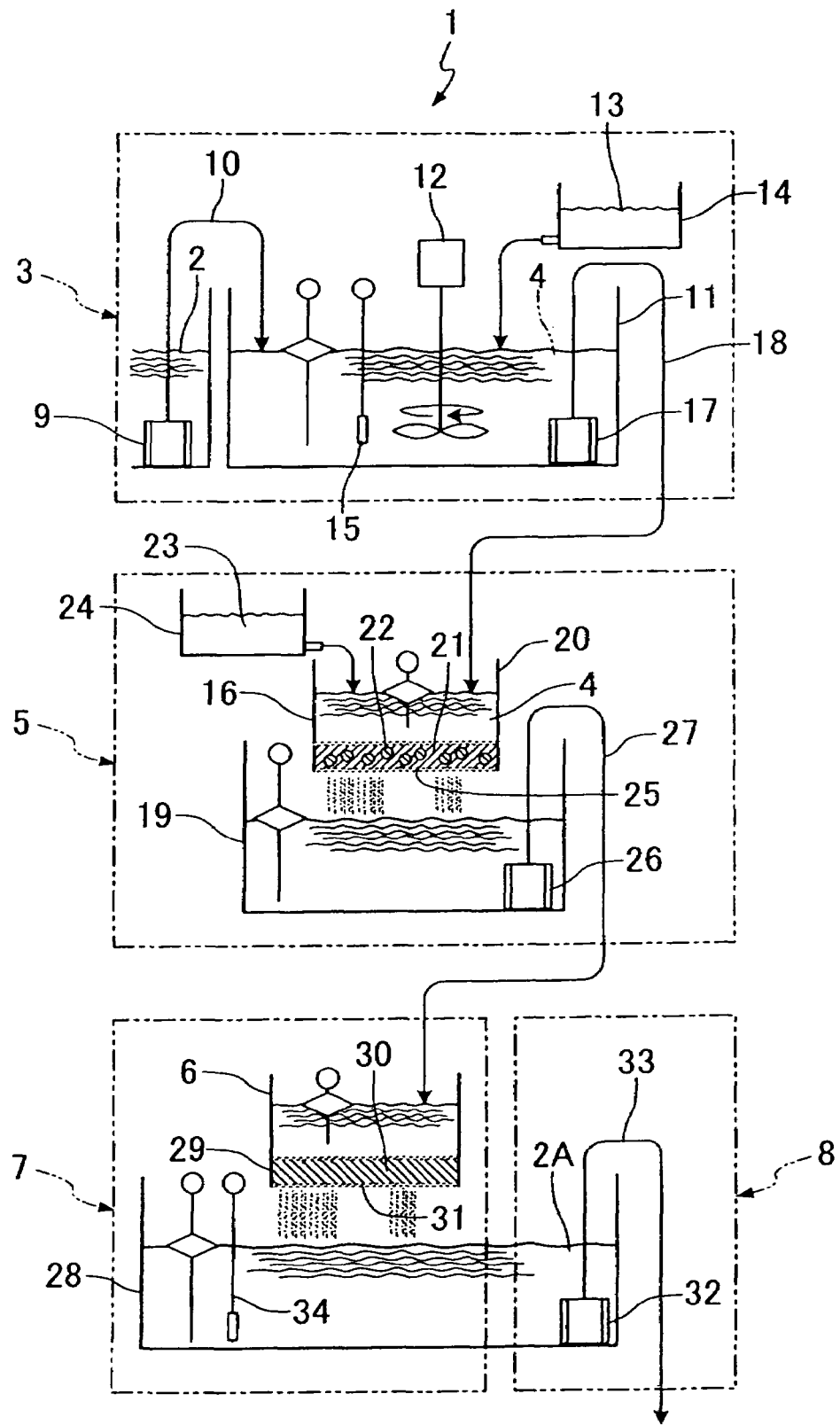
FIG. 2 is a schematic diagram to practice the first preferred embodiment to practice the present invention.

A first preferred embodiment to practice the present invention is shown in FIGS. 1 and 2, wherein 1 represents the colored wastewater discoloration method of the present invention, which can discolor and make colored wastewater 2 being generated from various production sites, human daily activities and so on and such as dye and pigment wastewater from textile industry and the like, pottery manufacturing industry wastewater containing glaze and the like, plating wastewater from metal-processing industry and the like, livestock industry wastewater, agroforestry wastewater, food industry wastewater, chemical and oil industry wastewater, electrical and electronics industry wastewater, iron and machine industry wastewater, restaurant industry wastewater and the like, into clear and colorless water 2A. The colored wastewater discoloration method 1 is comprised of: an acid adjustment process 3 wherein the colored wastewater 2 is acid adjusted; a color component fraction separation process 5 wherein, after the acid adjustment process, a color components fraction of acid wastewater 4 is separated; an adsorptive separation process 7 wherein, after the color component fraction separation process, remaining color components in the wastewater are adsorptively separated in a filter layer 6 embedded with autochthonous microorganisms; and a water discharge process 8 wherein clear and colorless water resulting from the adsorptive separation process 7, is discharged.

As illustrated in FIG. 2, in the acid adjustment process 3, colored wastewater 2 is supplied into a tank 11 through a colored wastewater supply pipe 10 having an intermediate pump 9, followed by agitation, using an agitator 12, of the colored wastewater 2 in the tank 11, while supplying acid adjuster 13 such as hydrochloric acid, nitric acid, sulfuric acid and so on from an acid adjuster supply tank 14, to adjust the colored wastewater 2 into the acid wastewater 4 of pH is 4 or less, preferably less than 2, to be measured by a pH sensor 15.

In the color component fraction separation process 5, the acid wastewater 4 is passed through a color component fraction separation filter layer 16. As illustrated in FIG. 2, the color component fraction separation filter layer 16 is comprised of: a color component fraction separation filter cylinder 20 to which the acid wastewater 4 in the tank 11 in the acid adjustment process 3 is supplied through a pump 17 and a supply pipe 18 and from which the wastewater is discharged into a tank 19; acid-treated sawdust 21 which is made from sawdust being disposed of in fungi production is contained in a filter layer within the color component fraction separation filter cylinder 20, the filter layer 25 being a mixture of the acid-treated sawdust 21 with rice husk charcoal and activated carbon 22; the wastewater in the cylinder 20 is mixed with alkaline adjuster 23 supplied from an alkaline adjuster supply tank 24 so that the pH within the cylinder 20 becomes 10 or above.

As illustrated in FIG. 2, the microorganism-embedded filter 6, used in the adsorptive separation process, is comprised of: an adsorptive filtration cylinder 29 to which the wastewater in the tank 19 from which the color component fraction has been separated is supplied through a pump 26 and a supply pipe 27, and then discharged from the cylinder 29 into a tank 28; and an adsorptive separation filter layer 31 made of rice husk charcoal, which has been acid-treated and then embedded with autochthonous-microorganisms, i.e., microorganisms existing in nature, is contained in the cylinder 29.

In the water discharge process 8, clear and colorless water 2A in the tank 28 used in the adsorptive separation process 7 is discharged to outside through a pump 32 and a water drainage hose 33.

Most of the color components of the colored wastewater 2 treated by the colored wastewater discoloration method are separated from the wastewater by passing the wastewater through the filter layer 25 the pH of which has been adjusted to be, like the pH of the color component fraction separation filter layer 16, 10 or above, whereupon the wastewater looses color and fades.

Also, by passing the thus treated wastewater through the adsorptive separation filter layer body 31 in the adsorptive separation process 7, the colored wastewater, having already lost color and faded, will have more than 99% of its remaining color components adsorbed thereon, and then is discharged as clear, colorless and clean water.

A point to be noted is that the tank 28 used in the adsorptive separation process 7 has a pH sensor 34 therein, because of which the water is discharged only when the pH is within the set value of the pH sensor 34.

Explained next are other embodiments to practice the present invention as illustrated in FIGS. 3 to 16. In explaining these other embodiments to practice the present invention, the same component parts as those in the first preferred embodiment to practice the present invention, are given the same numerals in order to avoid the overlapping explanations.

Figure 3:
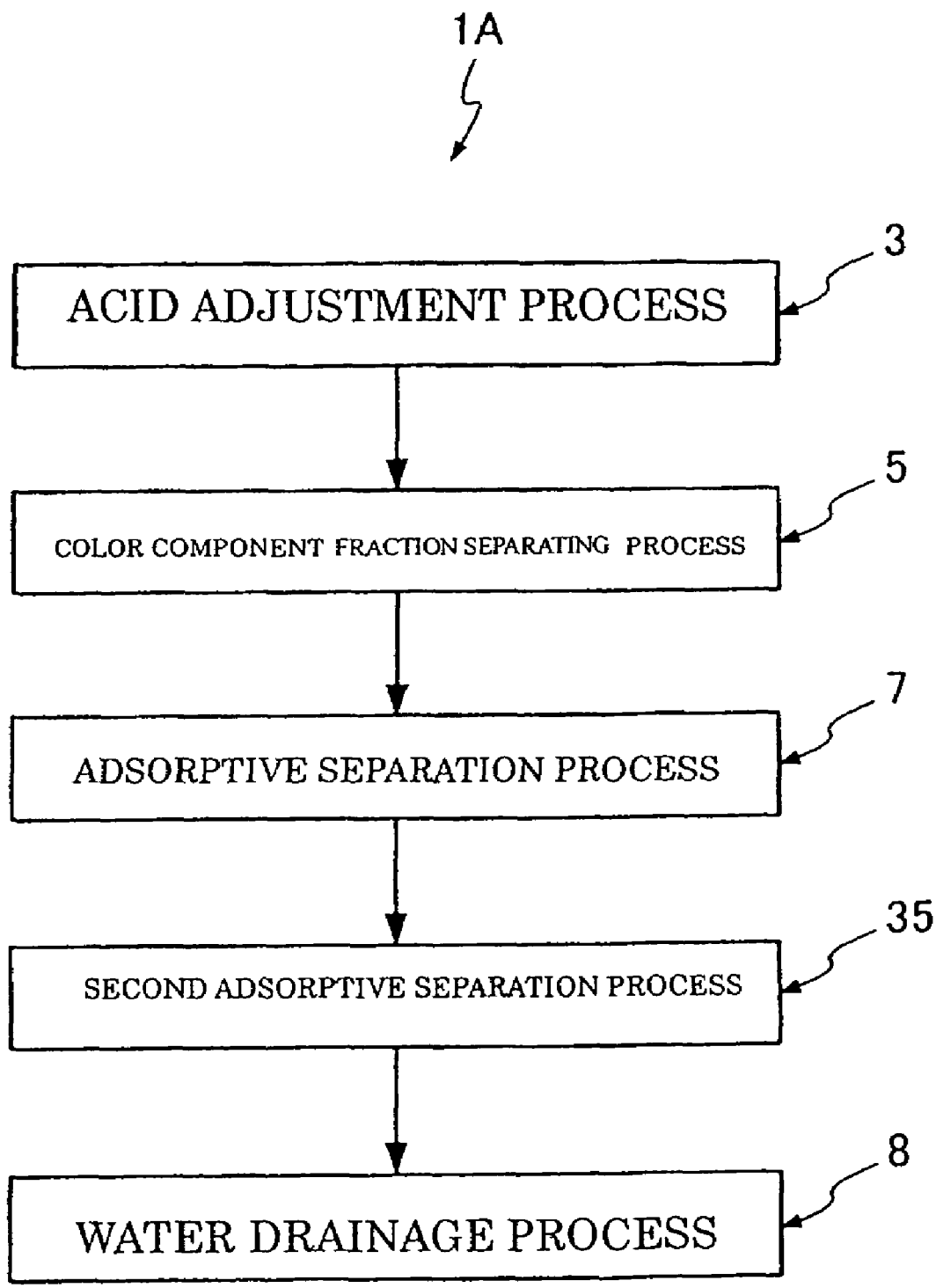
FIG. 3 is a process diagram to practice a second embodiment of the present invention.
Figure 4:
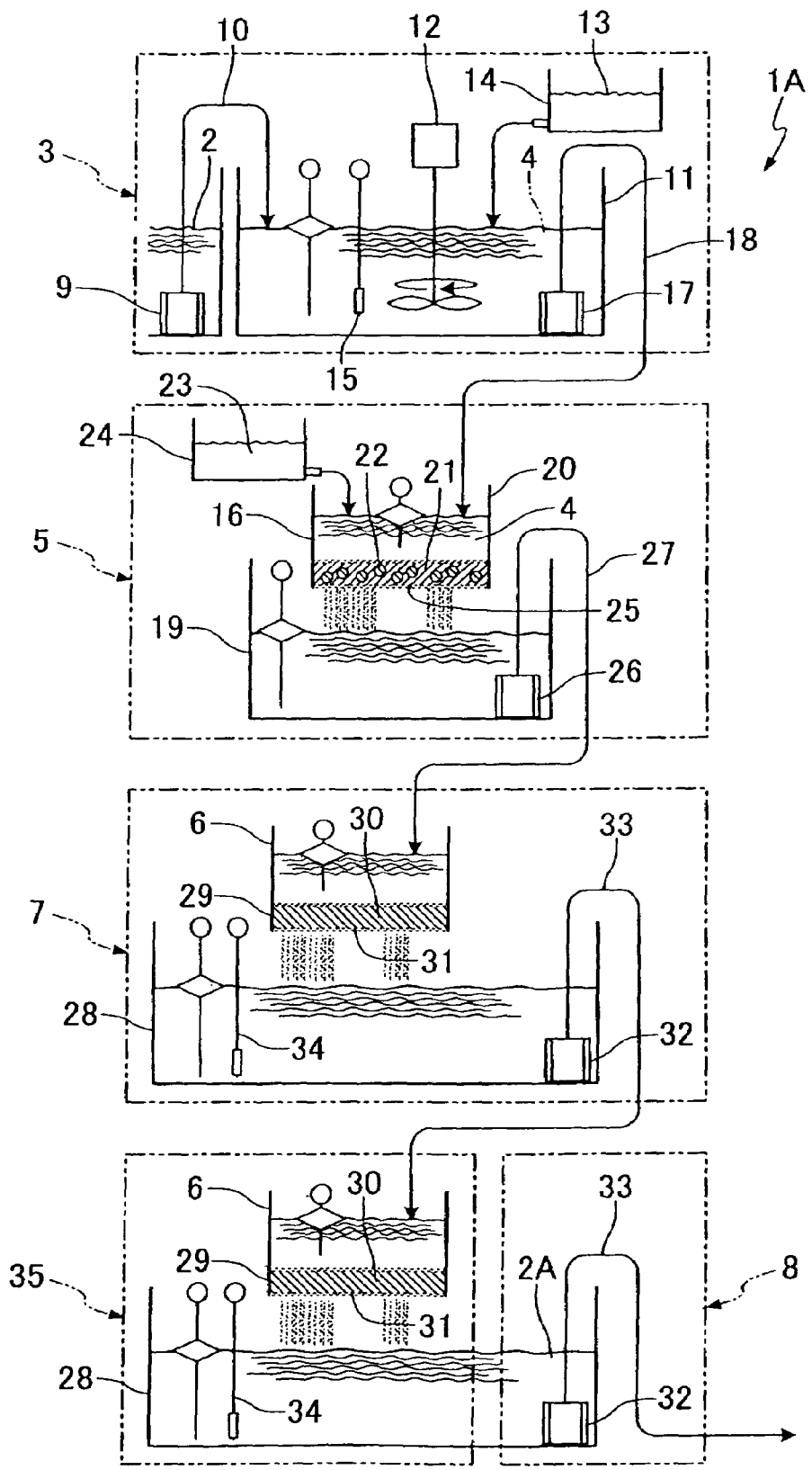
FIG. 4 is a schematic diagram to practice the second embodiment of the present invention.

A second embodiment to practice the present invention is shown in FIGS. 3 and 4. It is distinguished from the first preferred embodiment to practice the present invention that a second adsorptive separation process 35 utilizing a microorganisms-embedded filter layer 31 is performed after the adsorptive separation process 7. A colored wastewater discoloration method 1A utilizing a second adsorptive separation process 35 as described above provides effects similar to those of the first preferred embodiment to practice the present invention, as well as additional adsorptive separation of color components of the colored wastewater.

Figure 5:
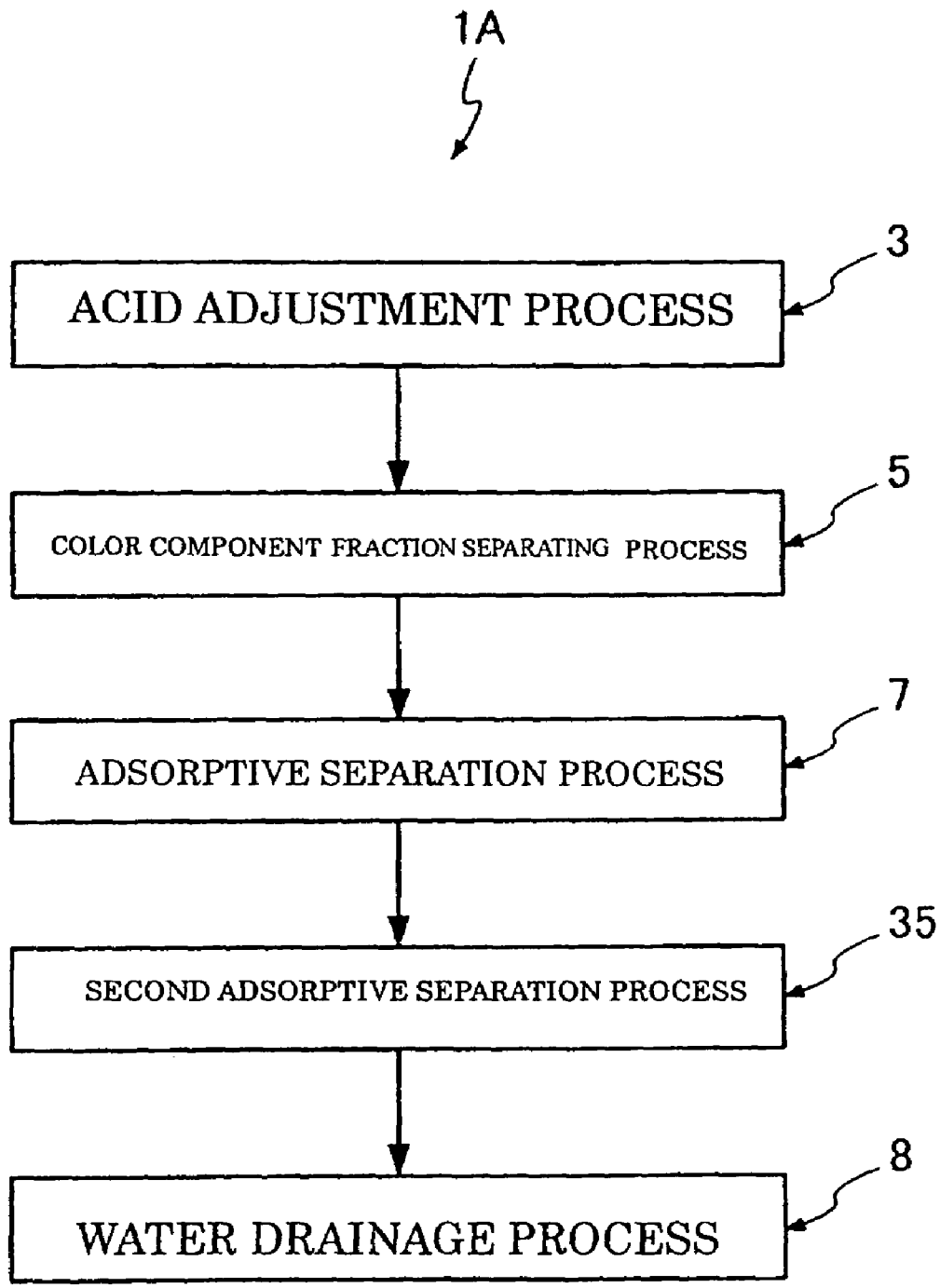
FIG. 5 is a process diagram to practice a third embodiment of the present invention.
Figure 6:
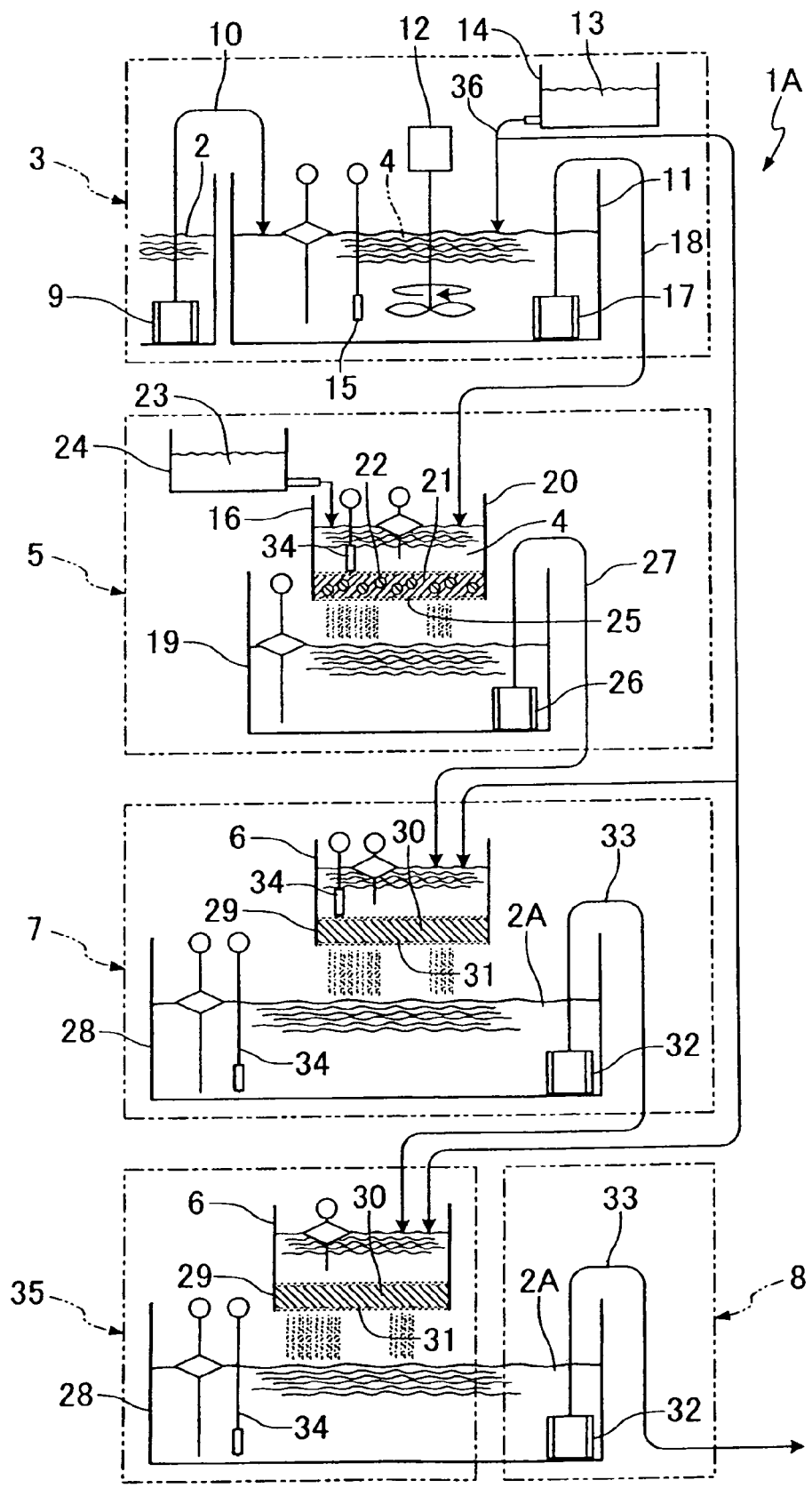
FIG. 6 is a schematic diagram to practice the third embodiment of the present invention.

A third embodiment to practice the present invention is shown in FIGS. 5 and 6. It is distinguished from the second embodiment to practice the present invention in that: the acid adjuster can be provided to contact microorganisms-embedded filter layers 31,31 in the adsorptive separation process 7 and a second adsorptive separation process 35, the treatment operation automatically stops by receiving signal from pH sensors 34, 34 when set value is exceeded, and the acid adjuster 13 is provided from the acid adjuster tank 14 to contact the microorganisms-embedded filter layers 31,31 to wash them for function recovery; and the acid adjuster 13 is also supplied through a supply pipe 36 into the tank 11 in which the acid adjustment process 3 is performed.

Another possible arrangement is that, simultaneously with automatic shutoff of the treatment operation, the alkaline adjuster 23 is supplied from the alkaline adjuster supply tank 24 to contact the color component fraction separation filter layer 16 in the color component fraction separation process 5 so as to restart operation automatically after alkalinity recovery.

Figure 7:
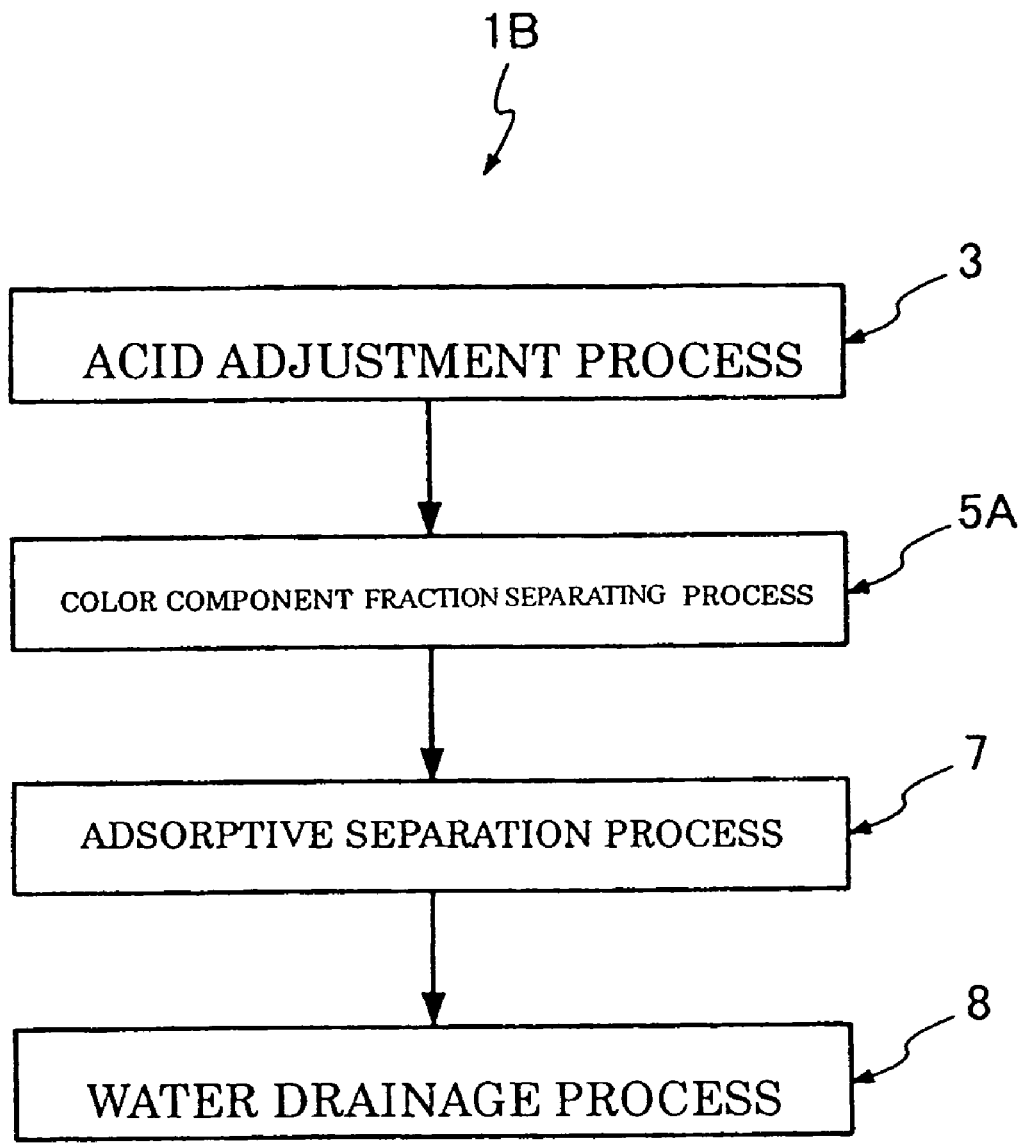
FIG. 7 is a process diagram to practice a fourth embodiment of the present invention.
Figure 8:
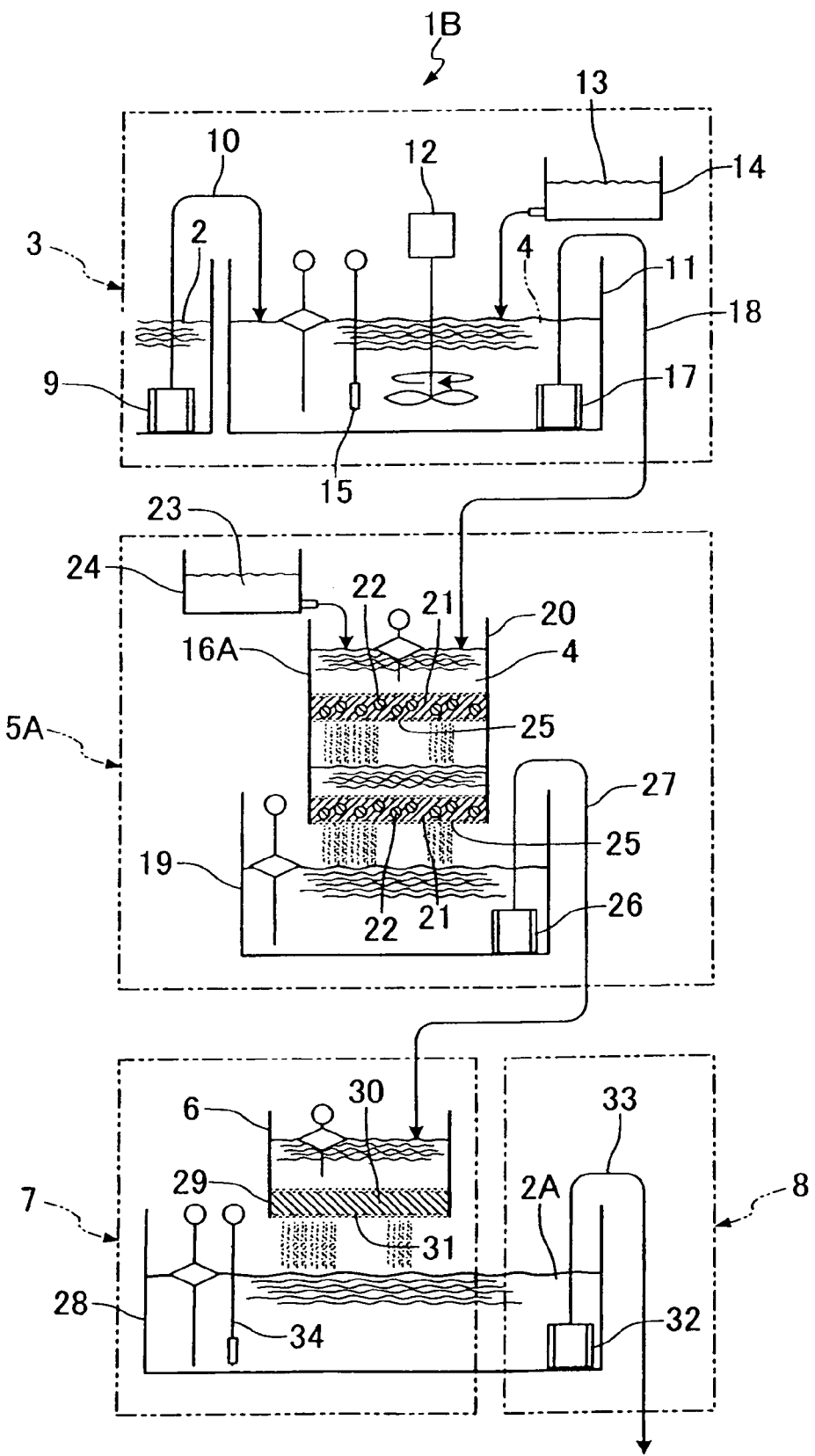
FIG. 8 is a schematic diagram to practice the fourth embodiment of the present invention.

A fourth embodiment to practice the present invention is shown in FIGS. 7 and 8. It is distinguished from the first preferred embodiment to practice the present invention in that a color component fraction separation process 5A is performed by utilizing a color component fraction separation filter layer 16A having filter layers 25, 25 installed in such manner as to form a dual layer within the color component fraction separation filter cylinder 20. A colored wastewater discoloration method 1B utilizing a color component fraction separation process 5A as described above provides effects similar to those of the first preferred embodiment to practice the present invention.

Figure 9:
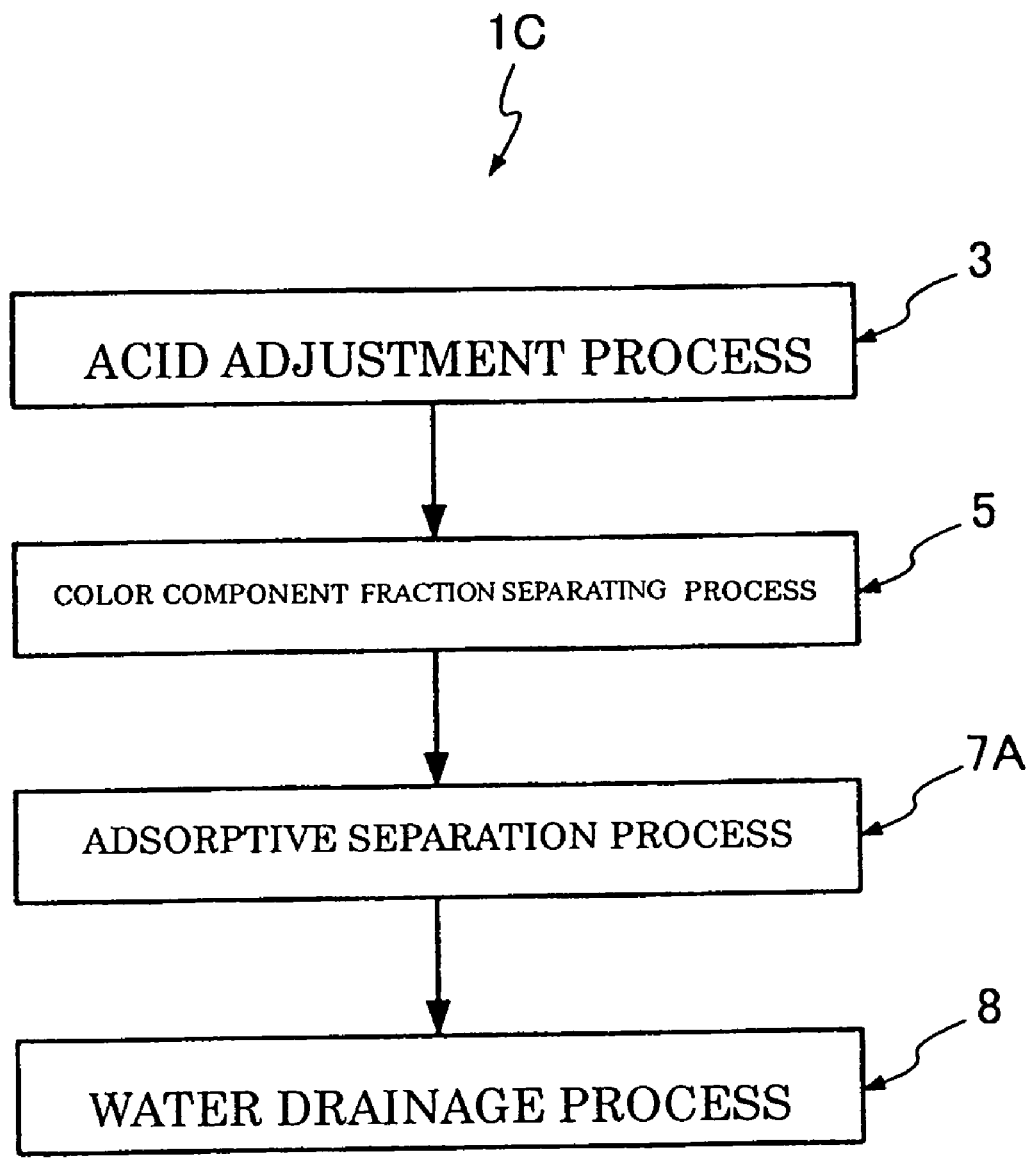
FIG. 9 is a process diagram to practice a fifth embodiment of the present invention.
Figure 10:
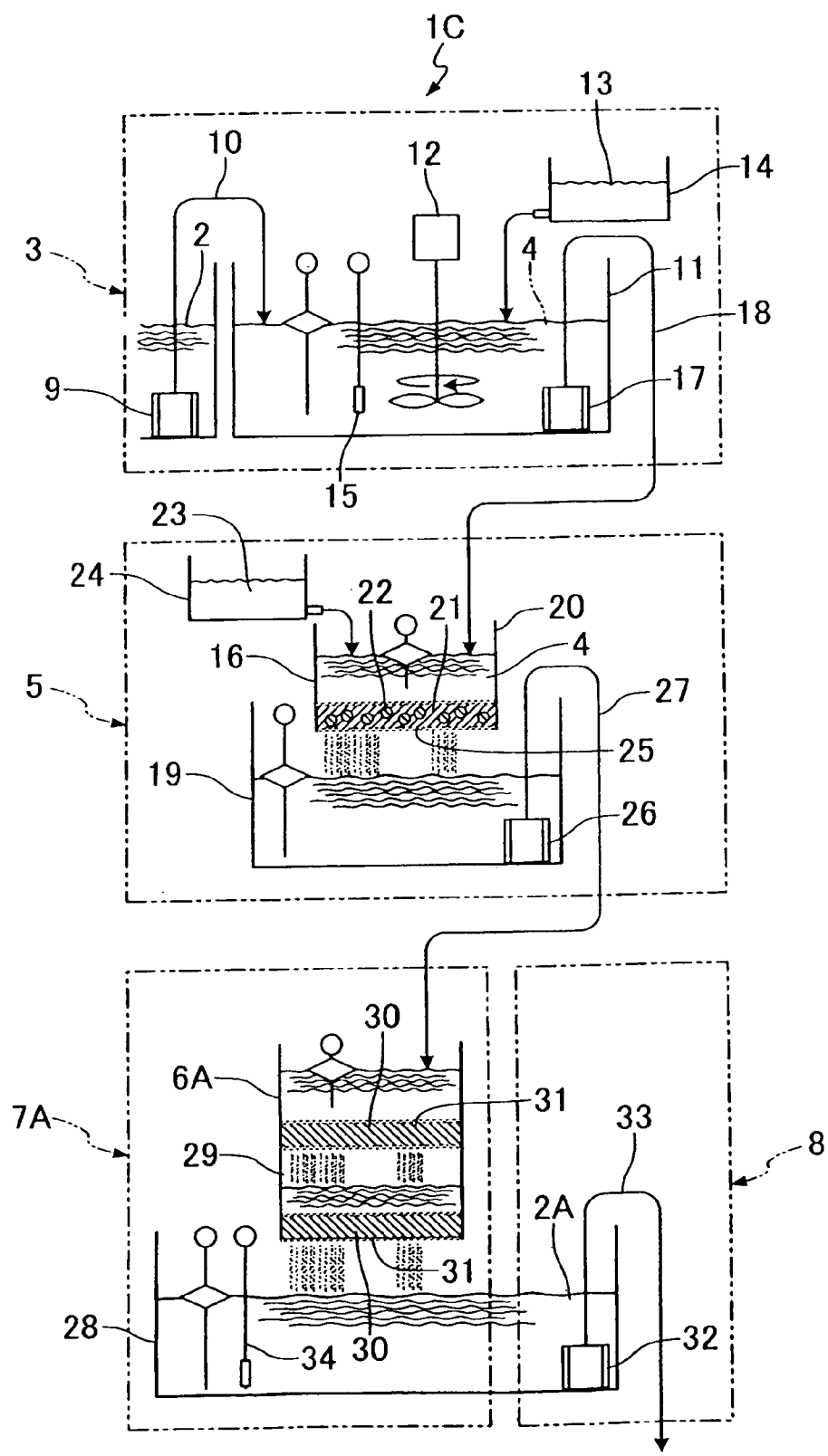
FIG. 10 is a schematic diagram to practice the fifth embodiment of the present invention.

A fifth embodiment to practice the present invention is shown in FIGS. 9 and 10. It is distinguished from the first preferred embodiment to practice the present invention in that an adsorptive separation process 7A is performed by utilizing a microorganisms-embedded filter 6A having filter layers 31, 31 installed in such manner as to form a dual layer within the color component fraction separation filter cylinder 29. A colored wastewater discoloration method 1C utilizing an adsorptive separation process 7A as described above provides effects similar to those of the first preferred embodiment to practice the present invention.

Figure 11:
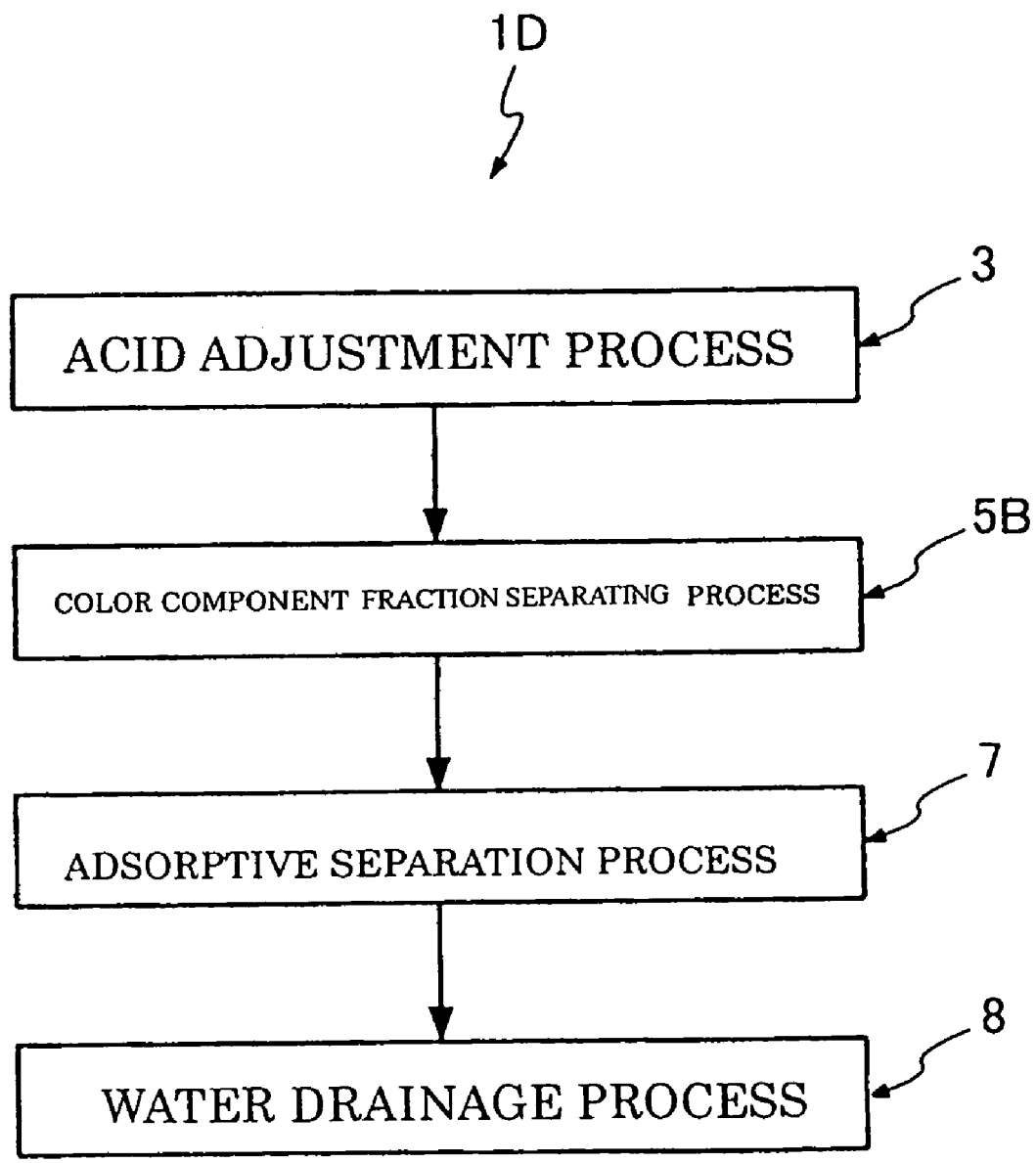
FIG. 11 is a process diagram to practice a sixth embodiment of the present invention.
Figure 12:
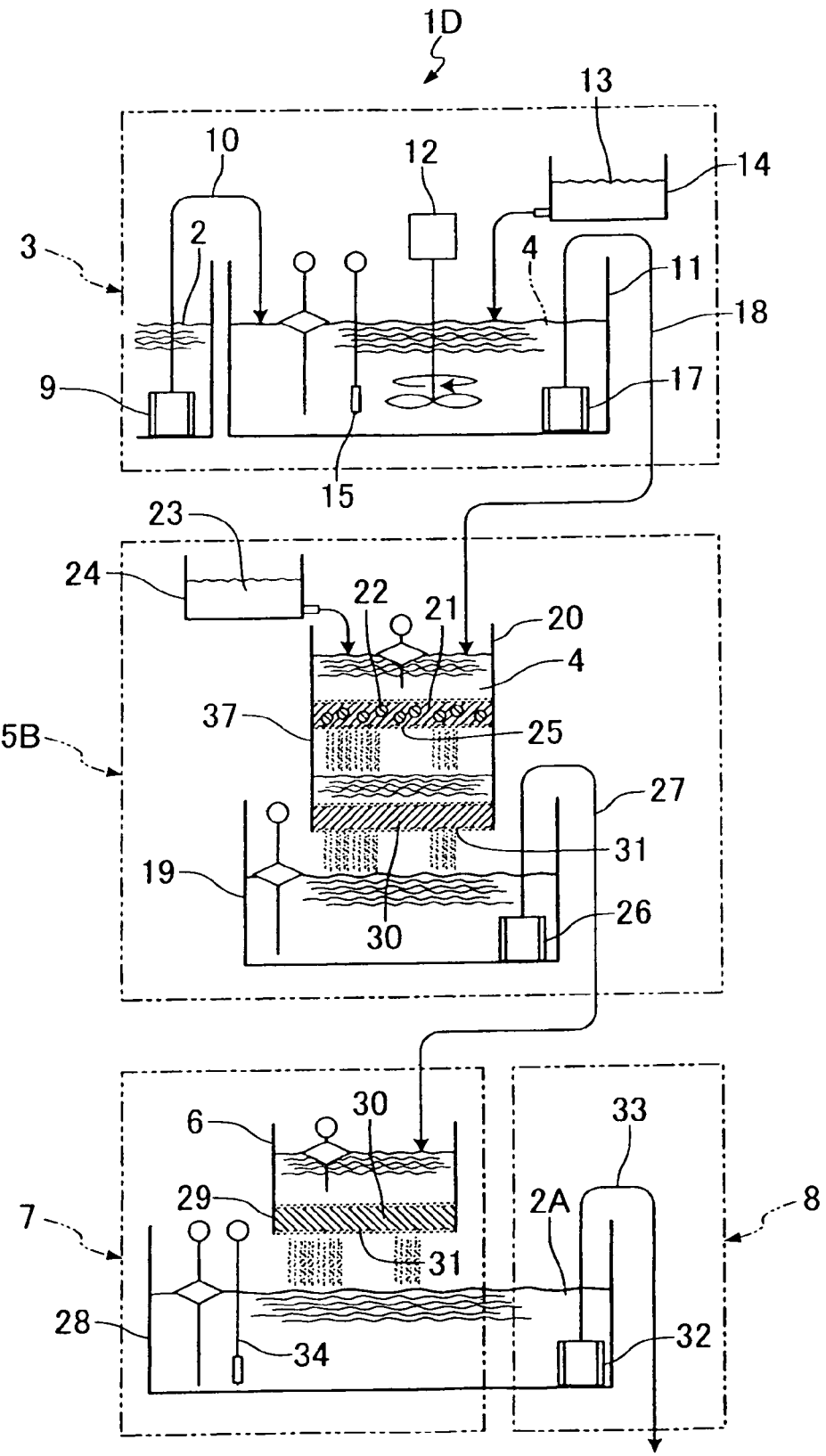
FIG. 12 is a schematic diagram to practice the sixth embodiment of the present invention.

A sixth embodiment to practice the present invention is shown in FIGS. 11 and 12. It is distinguished from the first preferred embodiment to practice the present invention in that a color component separation process 5B is performed by utilizing a dual filter 37 for color component fraction separation and adsorptive separation of color components, having a filter layer 25 for color component fraction separation and an adsorptive separation filter layer 31 installed in such manner as to form a dual layer within the filter cylinder 20. A colored wastewater discoloration method 1D utilizing an separation process 5B as described above provides effects similar to those of the first preferred embodiment to practice the present invention.

Figure 13:
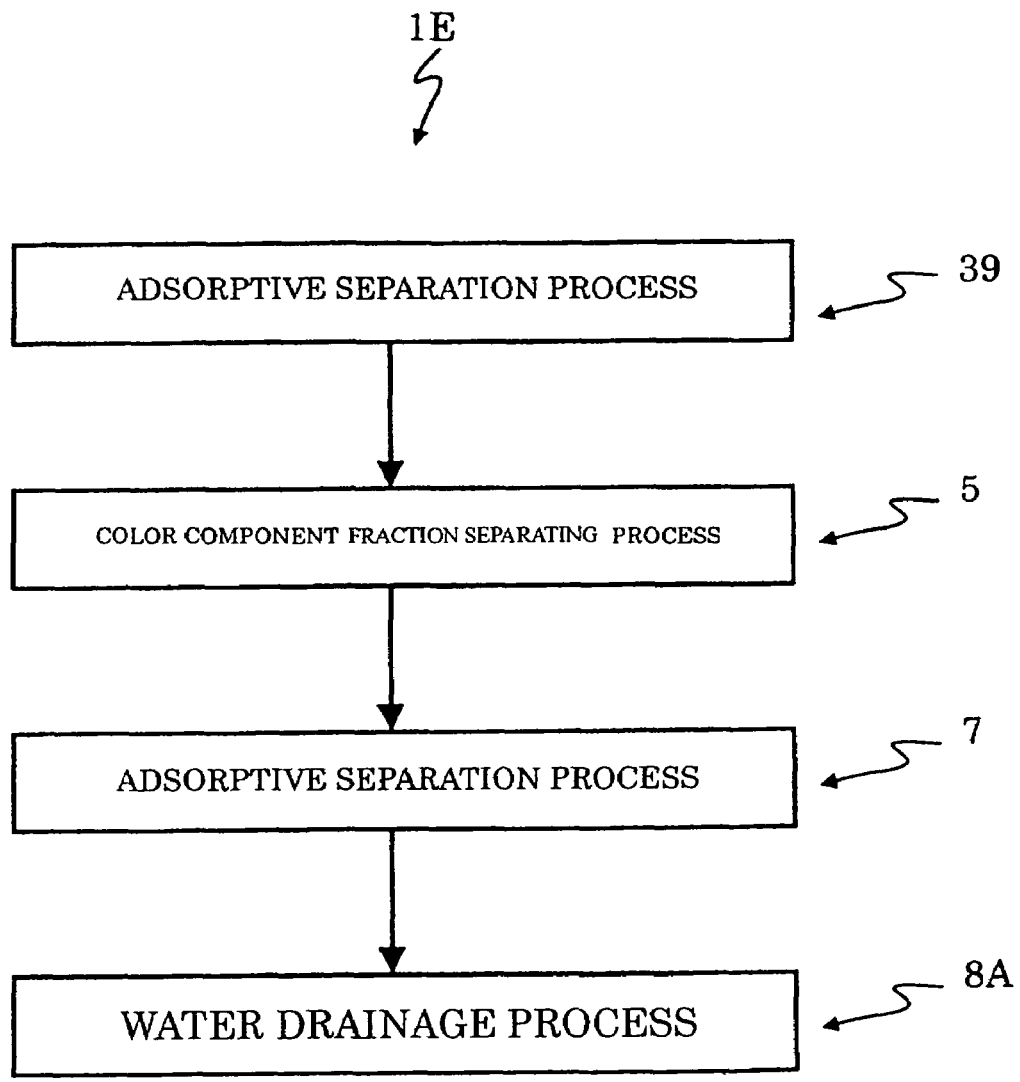
FIG. 13 is a process diagram to practice a seventh embodiment of the present invention.
Figure 14:
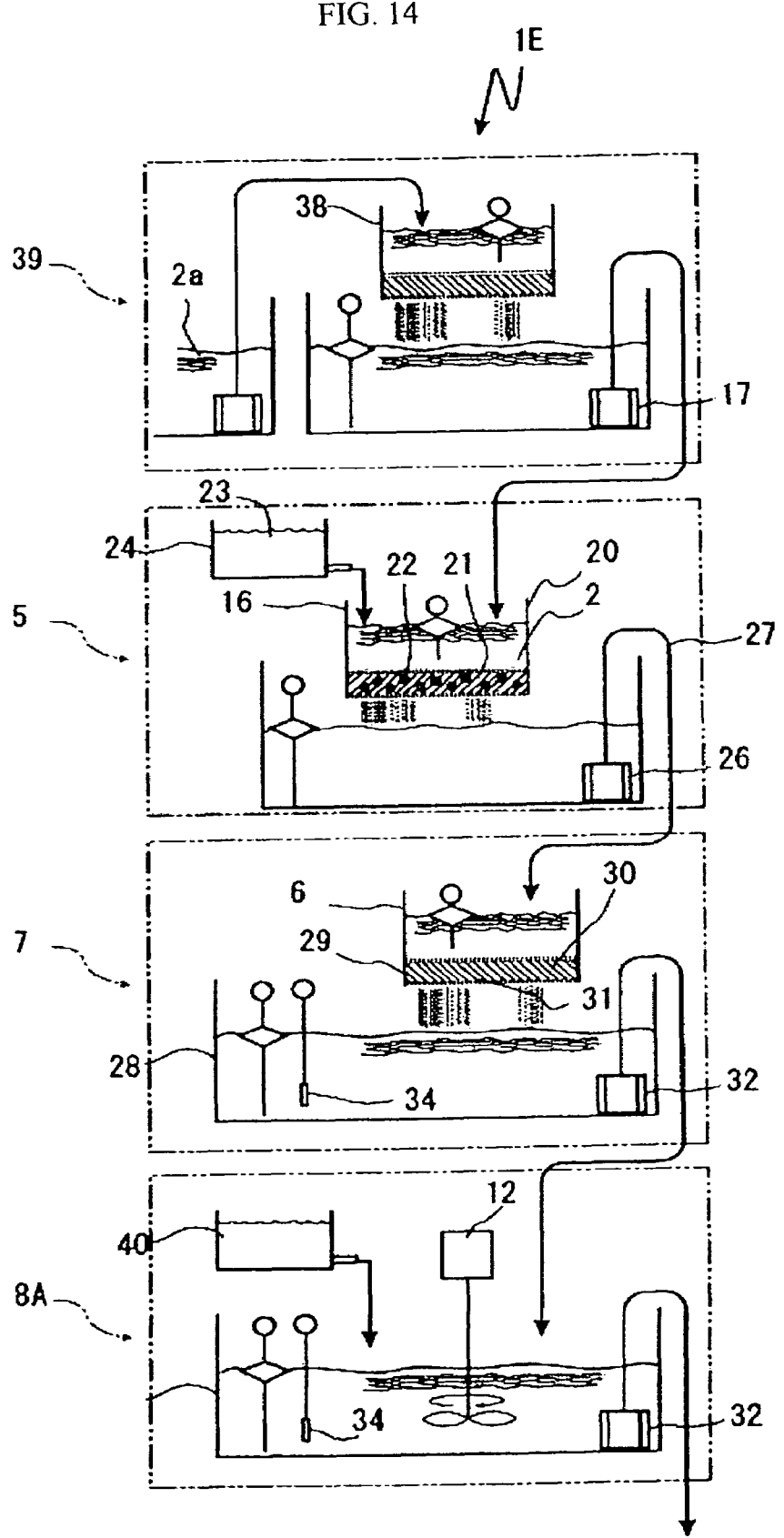
FIG. 14 is a schematic diagram to practice the seventh embodiment of the present invention.

A seventh embodiment to practice the present invention is shown in FIGS. 13 and 14. It is distinguished from the sixth embodiment to practice the present invention in that the colored wastewater discoloration method 1A is performed wherein: an adsorptive separation process 39 is performed, which adsorptively separates mineral oil and so on, floating on colored wastewater 2a, in a filter 38 containing a filter layer made from mixture of sawdust, wood chips and charcoal, in order to treat colored wastewater 2a containing mineral oil and so on generated from metal parts machining in industries such as automotive, shipbuilding, aircraft building, and machine tools; and a water discharge process 8A is performed, wherein the colored wastewater 2 resulting from treatment of the colored wasterwater 2a in the adsorptive separation process 39, is fed to the color component fraction separation process 5, followed by the adsorptive separation process 7 and an acid adjustment process 40 in order to discharge water after being adjusted to optimum pH for discharge into nature. Such a treatment method as described above removes mineral oil, color components and so on from the colored wastewater 2a containing mineral oil and so on, so that the colored wastewater is treated to be made into clear and colorless water optimum for discharge into nature.

Figure 15:
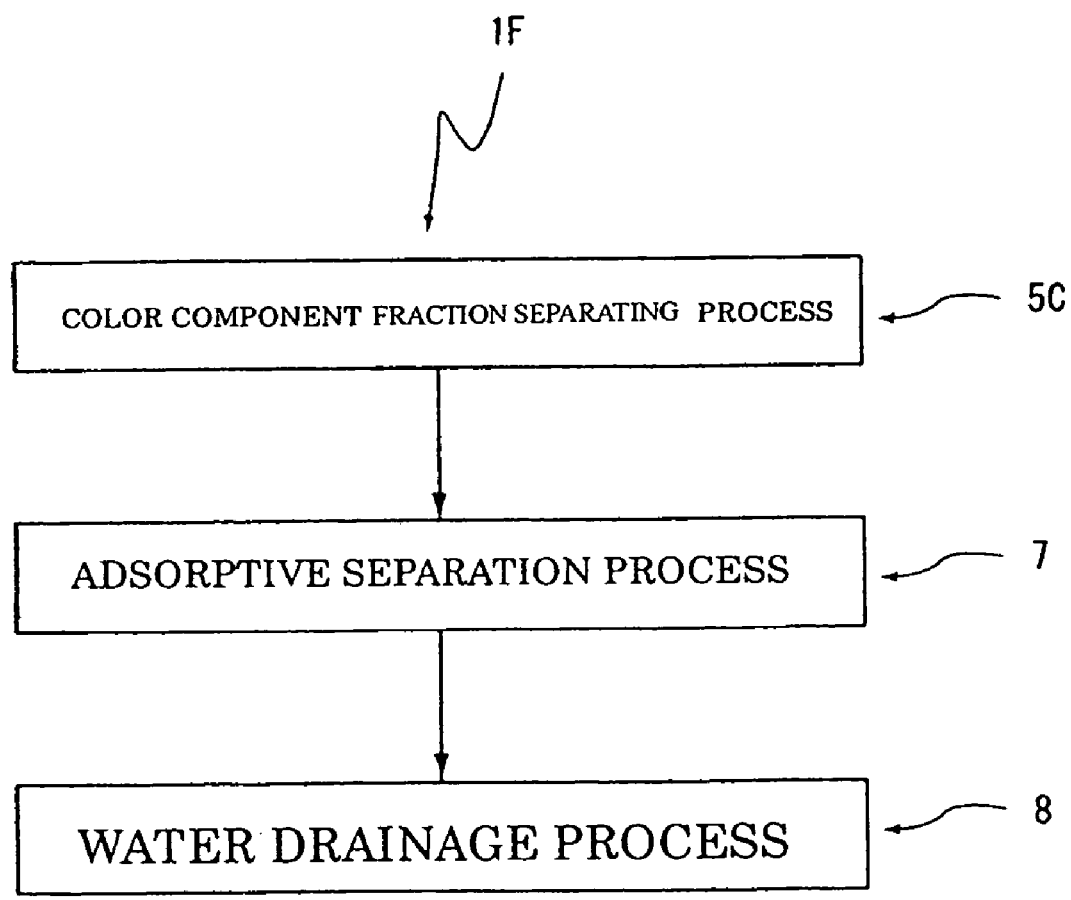
FIG. 15 is a process diagram to practice an eighth embodiment of the present invention.
Figure 16:
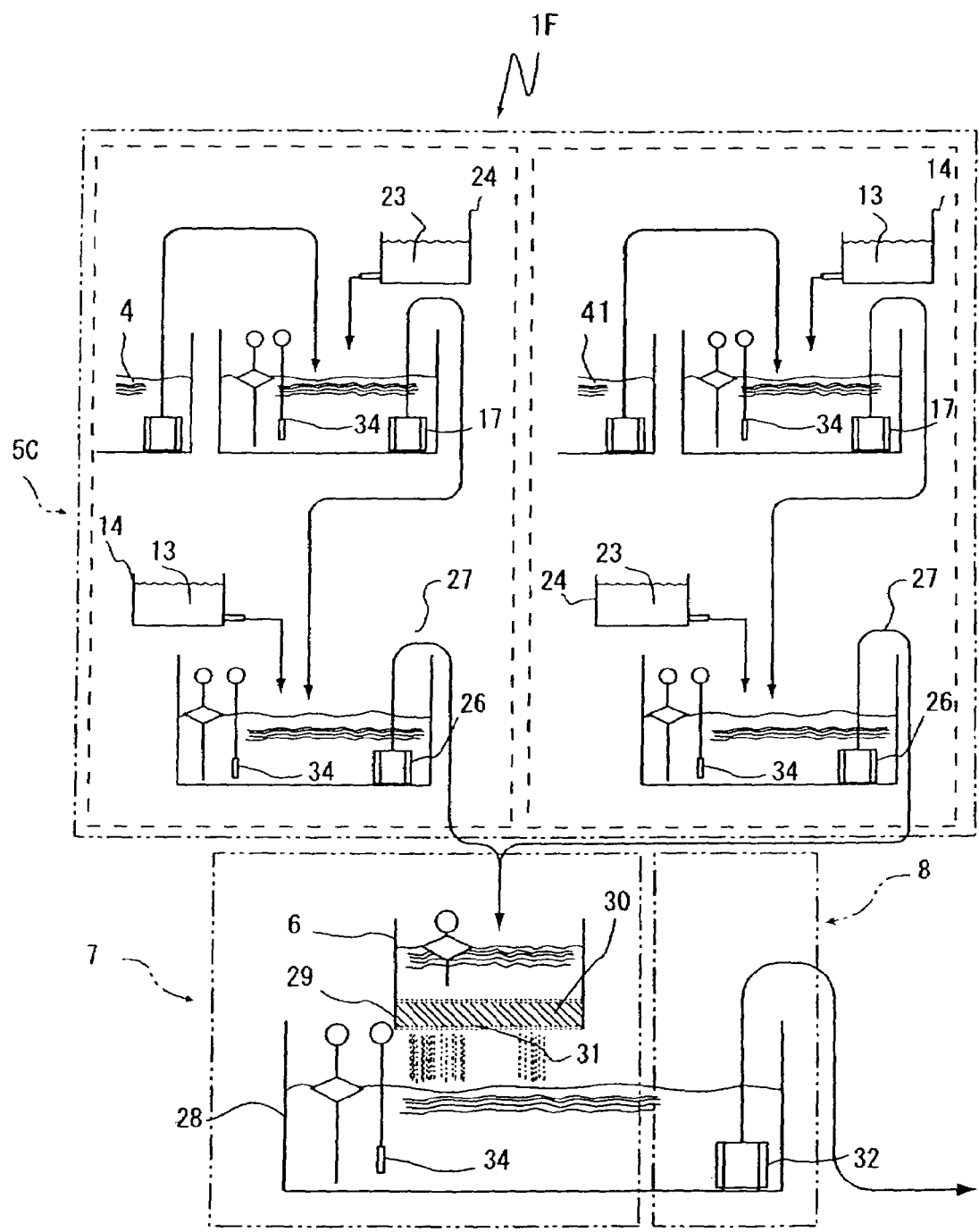
FIG. 16 is a schematic diagram to practice the eighth embodiment of the present invention.

An eighth embodiment to practice the present invention is shown in FIGS. 15 and 16. It is distinguished from the first preferred embodiment to practice the present invention that a colored wastewater discoloration method 1F is performed wherein: a color component fraction separation process 5C is performed, which separates a color components fraction of the colored wastewater from the colored wastewater in such manner that, in case the colored wastewater is the acid wastewater 4, the alkaline adjuster 23 is added to and mixed with it until pH reaches 10 or over, followed by a step wherein the acid adjuster 13 is added to and mixed with it until pH reaches 3 or lower, or in case the colored wastewater is the alkaline wastewater 41, the acid adjuster 13 is added to and mixed with it until pH reaches 3 or lower, followed by a step wherein the alkaline adjuster 23 is added to and mixed with it until pH reaches 10 or over; and the adsorptive separation process 7 is performed following the color component fraction separation process 5C. In the adsorptive separation process 7, the wastewater from which the color components fraction has been separated is passed through a filter layer for remaining color components to be adsorbed thereon, the filter layer being a material, such as acid-treated rice husk charcoal, in which are embedded autochthonous-microorganisms, i.e., microorganisms existing in nature. Such a treatment method as described above provides effects-similar to those of the first preferred embodiment to practice the present invention as well as an intensive discoloration of the colored wastewater.

The present invention is applicable in the industry of treating colored wastewater generated in various production sites, human daily activities and so on.

What is claimed is:

1. A method of discoloring colored wastewater from industries, restaurants, agroforestry, agriculture, livestock raising and restaurants, comprising mixing the wastewater with an acidic substance to acidify the wastewater to a pH no higher than 4; then filtering the acidic wastewater through a filter layer comprising a mixture of charcoal and acid-treated sawdust made from sawdust which had been used for production of fungi, pH of the filter layer being adjusted to an alkaline pH of at least 10 for the filtering by contacting of the filter layer with an alkaline adjuster, the filtering separating from the wastewater a fraction thereof containing components which imparted color to the wastewater; and then passing the wastewater through a filter material comprising acid-treated charcoal embedded with autochthonous microorganisms thereby to adsorb remaining color-imparting components onto the filter material.

2. The method of claim 1, wherein the charcoal in the mixture of charcoal and acid-treated sawdust comprises rice husk charcoal or activated carbon.

3. The method of claims 1, wherein the charcoal embedded with autochthonous microorganisms comprises rice husk charcoal.

4. The method of claim 1, comprising further treating the wastewater by passing the treated wastewater through a second filter material comprising acid treated charcoal embedded with autochthonous microorganisms.

5. The method of claim 4 wherein the filter materials comprising acid treated charcoal embedded with autochthonous microorganisms are positioned within two separate filtration containers.

6. The method of claim 5, further comprising washing the microorganism embedded filter materials with the acidic substance.

7. The method of claim 4, wherein the filter materials comprising acid treated charcoal embedded with autochthonous microorganisms are positioned as two layers within a single filtration container.

8. The method of claim 4, wherein the filter materials comprising acid treated charcoal embedded with autochthonous microorganisms are positioned as a first filter layer below the layer of charcoal and acid treated sawdust and a second filter within a separate filtration container.

9. The method of claim 1, further comprising filtering the wastewater through a second filter layer comprising a mixture of charcoal and acid treated sawdust prior to passing the wastewater through the filter material comprising acid treated charcoal embedded with autochthonous microorganisms.

\* \* \* \* \*